April 16, 1957  M. P. WINTHER  2,788,872
VEHICLE ACCELERATION CONTROL
Filed Jan. 18, 1951
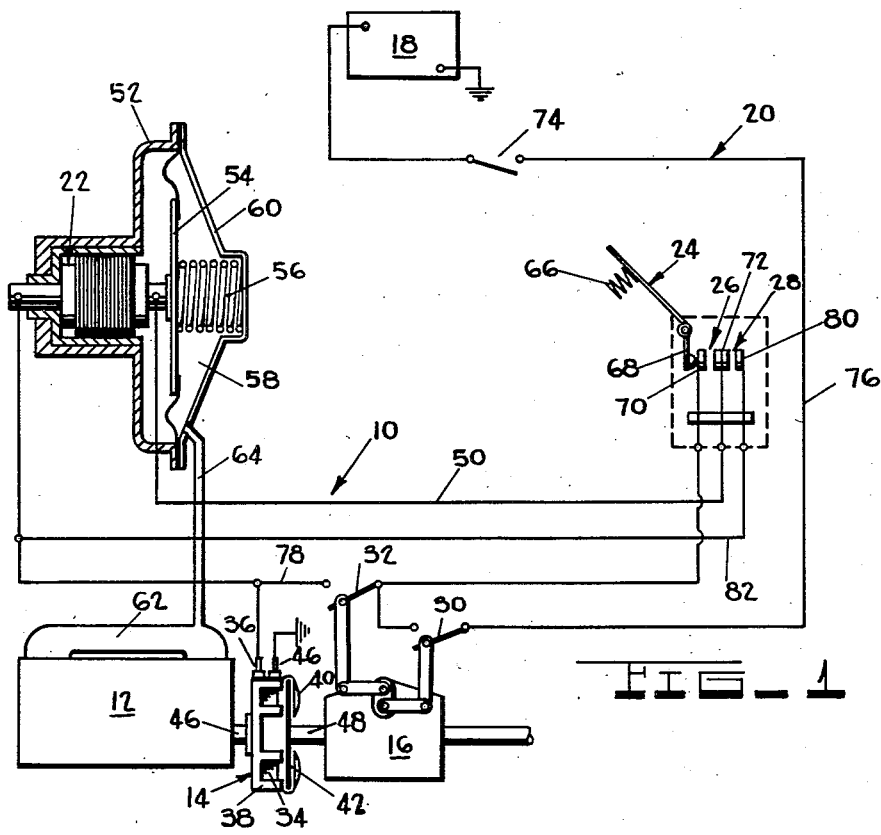
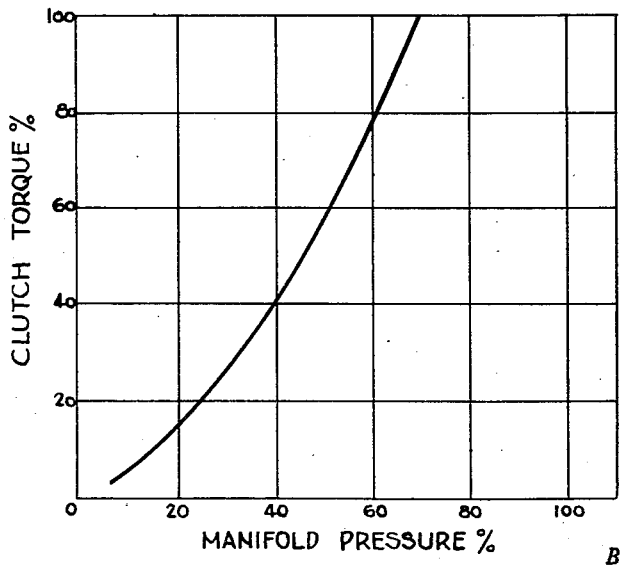
INVENTOR.
MARTIN P. WINTHER
BY
*McDonald & Fragno*
ATTORNEYS :::::: {.columns}
::: {.column}
2,788,872

VEHICLE ACCELERATION CONTROL

Martin P. Winther, Gates Mills, Ohio, assignor, by mesne assignments, to Eaton Manufacturing Company, Cleveland, Ohio, a corporation of Ohio Application January 18, 1951, Serial No. 206,643

20 Claims. (Cl. 192—.052)

This invention relates to vehicles and more particularly to acceleration control means for internal combustion engine and power transmission driven vehicles.

Broadly the invention comprehends the provision of an internal combustion engine and power transmission driven vehicle having an electromagnetic clutch coupling the engine to the transmission and wherein the clutch excitation is controlled by the atmospheric pressure in the intake manifold of the engine, accelerator pedal position and gear ratio operation of the transmission.

Among the objects of the invention is the provision of acceleration control means for internal combustion engine and power transmission driven vehicles that is simple and effective in operation that provides modulated vehicle acceleration in proportion to the atmospheric pressure in the intake manifold of the engine for given accelerator pedal position and transmission gear ratio operation, that includes a current excitable electromagnetic clutch connected between the engine and transmission, that has the clutch thereof supplied modulated current in proportion to the atmospheric pressure in the intake manifold of the engine; and that includes electrical switches in the current supply to the clutch for respectively providing no current, current modulation and full current supply.

Other objects and advantages of the invention will appear from the following description taken in connection with the drawings forming a part of the specification, and in which:

Fig. 1 is a schematic layout of an acceleration control system as incorporated with an engine, electromagnetic clutch and transmission set up for a vehicle with a vacuum operated carbon pile resistor therefor shown in section; and Fig. 2 is a clutch torque-manifold pressure curve typical of the operation of the system of Fig. 1.

Referring to the drawings for more specific details of the invention 10 represents generally an acceleration control system for automotive vehicles and the like as incorporated with an engine 12, an electromagnetic clutch 14 and a power transmission 16.

The control system 10 operates to control the operation of clutch 14 in providing for the supply of current thereto as dictated by the operation of the engine and the transmission. The system includes a battery 18 or other suitable source of electrical supply system 20, controlled as by a variable resistance carbon pile resistor 22, a pair of accelerator pedals 24, actuated switches 26 and 28, and a pair of gear ratio position actuated switches 30 and 32.

The current from the battery 18 as controlled by the resistor and switches is supplied to the coil 34 of the clutch 14 by way of electrical current brush and contactor assembly 36 associated with the clutch.

The clutch 14 in addition to the coil 34 includes a pole member 38 upon which the coil is mounted, an armature 40, mounted upon the member 38 for axial movement relative thereto and rotation therewith and a clutch plate
:::

::: {.column}
42 axially spaced between the pole member 38 and armature 40 for engagement therewith. A ground brush and contactor assembly 44 are associated with the coil 34 of the clutch opposite its current supply end.

Whereas the pole member 38 is driven by the output shaft 46 of the engine the clutch plate 42 driven as by engagement with the pole member 38 and armature 40 is connected to the input shaft 48 of the transmission 16.

The carbon pile resistor 22 is electrically connected in circuit 50 of electrical system 20 and supported for movement in a housing 52. Housing 52 has mounted therein a vacuum actuated diaphragm 54, resiliently pressed into engagement upon the carbon pile resistor by a spring 56 bearing in the diaphragm in opposing relation to vacuum created in vacuum chamber 58 formed in one end of housing 52 closed as by cover plate 60. Vacuum chamber 58 is provided communication with the intake manifold 62 of engine 12 by way of conduit 64 connected therebetween.

Spring 56 is provided with a rate effective to give satisfactory values of resistance through the carbon pile resistor.

Accelerator pedal 24 is pressed outwardly by a spring 66 and includes a lever arm 68 engageable upon initial pivotal action of the pedal 24 to close contacts 70 and 72 of switch 26 providing flow of current therethrough in circuit 50.

An ignition switch 74 and switch 30 are arranged in the main circuit 76 of the electrical system for controlling the flow of current therethrough, switch 74 being operative to close the circuit when the engine is placed in operation and switch 30 being actuated to close the circuit 76 when the transmission is in gear and to open the circuit when the transmission is in neutral.

Switch 32 is positioned in circuit 78 operative to close the circuit and thus by-pass current flow directly to coil 34 of the clutch when the transmission is operating in one of its higher gear ratios, such as third.

Through the movement of pedal 24 beyond engagement of contacts 70 and 72, contact 72 is moved to engage 80 of switch 26 thereby providing for current flow by way of circuit 82 directly to the coil in by-passing relation to the carbon pile resistor 22.

The switches 30 and 32 are each actuated by lever arrangements or the like 82 and 84 respectively; such that as the transmission is shifted to a particular gear ratio, the lever arrangements depending the gear ratio selected are moved to either open or close the respective circuits 76 and 78 in which they are arranged.

In a normal operation assuming that the ignition switch 74 for the engine has been turned on and the engine started, the power output of the engine will be immediately transmitted to the output shaft thereof resulting in rotation of pole member 38.

With the engine in operation and the accelerator pedal unmoved as shown in the position of Fig. 1 and the transmission in neutral no current flow to the clutch will be had and consequently the clutch will be inoperative to transmit any power.

As it shall be desired a shifting of the transmission, out of neutral and into gear, will result in switch 30 being closed such that current will then be able to flow in circuit 76 through switch 74 and switch 30 up through contact 70 of switch 26. Inasmuch as switch 32 is made to operate preferably at higher gear ratios of the transmission, we will for the time assume the shift from neutral to be to the first gear ratio thereby assuring the circuit 78 being open by way of switch 32.

Upon depressing accelerator pedal 24 an initial acceleration amount, the lever 68 thereof operates to actuate contact 70 into engagement with contact 72 to thus
:::
::::::

close switch 26 and provide for the flow of current therethrough and circuit 50 by way of carbon pile resistor 22 to the coil 34 of clutch 16 for the energization thereof. The flow of current in passing through the carbon pile resistor 22 is modulated for flow to coil 34 as controlled by the vacuum created in the engine manifold and acting by way of conduit 64 and chamber 68 upon diaphragm 54 to resist the force of spring 56. The excitation of the clutch coil is so regulated that it will be in proportion to the atmospheric pressure in the intake manifold of the engine such that as the vacuum increases the resistance to current flow of the carbon pile resistor will increase and vice versa with the vacuum decreasing.

With the modulated flow of current to coil 34 of the clutch the armature 40 is drawn axially toward the pole member 38 effective to engage the clutch plate therebetween and thus transmit to the transmission by way of shaft 48 power for subsequent delivery at first gear ratio of the transmission to the wheels of the vehicle to be propelled thereby.

As the accelerator is further depressed the engaged contacts 70 and 72 are moved together until contact 72 engages contact 80 of switch 28 resulting in current flow therethrough to circuit 82 for direct delivery to coil 34 of clutch 14. In this manner resistor 22 is by-passed and full current is had at coil 34 for the pull torque capacity transmission of power from the engine 12 to transmission 16.

The modulated and direct current control of coil 34 by way of switches 26 and 28, actuated by the pedal position, is had, so long as switch 32 maintains circuit 78 open, but with switch 32 closed current is made to flow directly to the coil regardless of the accelerator position or vacuum in the intake of the manifold. This operation of closing the switch 32 is made to occur preferably at higher ratio gears and for purposes of illustration is here actuated when transmission 16 is shifted to its third speed gear ratio.

Fig. 2 graphically illustrates the proportionate relation existing between the manifold pressure and the clutch torque capacity such that a smooth acceleration control of the vehicle is achieved especially in say 1st and 2nd gear ratios of transmission 16 when the accelerator pedal is progressively moved for a desired acceleration of the vehicle to which this control system is applied.

The elements going to make up this acceleration control system as applied to an illustration engine, clutch and transmission arrangement, are shown as in the case of resistor 22 in an illustrative sense and are not to be construed in a limited sense as many departures in structure and application could be made by those skilled in the art without departing from the basic premise of this invention and accordingly the claims are to be read in their broadest interpretation consistent with the description hereinbefore presented.

What I claim is:

1. A vehicle acceleration control system comprising an internal combustion engine, an electromagnetic clutch including an input member driven from the engine, an output member cooperable with the input member and a coil affixed to one of the members, a power transmission driven by the output member of the clutch, a source of electrical power, an electrical system, connected to the power source, supplying current to the coil including means for automatically modulating the current to the coil, a switch controlled means for by-passing the means for modulating the current to the coil, and a switch in series with the modulating means, controlling current flow to the means for modulating the current to the coil, and means for sequentially closing in order the switch and switch controlled means to render the latter operative to initially provide for the flow of current through the modulating means and subsequently provide for the bypassing of the modulating means.

2. A control system according to claim 1 wherein shift means are provided for the transmission wherein the electrical system includes a second switch controlled means for by-passing the means for modulating the current to the coil and wherein shift means are provided for the transmission and wherein means operatively connected between the shift means for the transmission and said second switch controlled means control the switch operation thereof.

3. A control system according to claim 2 wherein switch means control the flow of current in the electrical system.

4. A control system according to claim 3 wherein the switch means includes a pair of independently operated switches in series each of which controls the flow of current in the electrical system, and wherein one of said pair of switches is controlled for operation by means connected therebetween with the means for shifting the transmission.

5. A control system according to claim 1 wherein the current modulating means includes a variable electrical resistance means and means actuated by the vacuum of the engine for varying the resistance of the variable resistance means.

6. A control system according to claim 1 wherein the means for consecutively operating the switch and switch controlled means is an accelerator pedal.

7. A control system according to claim 4 wherein the other of said pair of independently operated switches is the engine ignition switch.

8. A control system according to claim 4 wherein the current modulating means includes a variable electrical resistance means and means actuated by the vacuum of the engine for varying the resistance of the variable resistance means and wherein the means for consecutively operating the switch and switch controlled means is an accelerator pedal.

9. A control system according to claim 8 wherein one of said pair of independently operated switches is an ignition switch.

10. A control system according to claim 9 wherein the variable resistance means is in the form of a carbon pile.

11. A vehicle acceleration control system comprising an internal combustion engine, a power transmission, shift means for the transmission, an electromagnetic clutch including a power input member connected to a power output member of the engine, a power output member connected to a power input member of the transmission, and an electromagnetic coil affixed to one of the members thereof, an electrical system supplying current to the coil including two parallel electrical circuits, a make and break switch and a variable resistance means in series in one of the circuits, and a make and break switch in the second circuit, engine vacuum actuated means for varying the resistance in the first circuit, and means for sequentially closing first the make and break switch in the first circuit and then the make and break switch in the second circuit.

12. A control system according to claim 11 wherein the electrical system includes a third circuit, in parallel with the other circuits, controlled as by a make and break switch operatively connected to the shifting means for the transmission.

13. A control system according to claim 12 wherein the electrical system includes a make and break switch, common to all the circuits, operatively connected to the shifting means for the transmission.

14. A control system according to claim 11 wherein the engine vacuum actuated means includes a vacuum cylinder having conduit communication with the intake manifold of the engine.

15. A control system according to claim 14 wherein the means for consecutively operating the make and break switches is a spring tensioned accelerator pedal.

16. A control system according to claim 13 wherein the make and break switch common to all the circuits is operatively moved to open position when the transmission is placed in neutral position.

17. In a vehicle, an internal combustion engine, an electromagnetic clutch including an input member driven from the engine, an output member cooperable with the input member and a coil affixed to one of the members, a power transmission driven by the output member of the clutch, a source of electrical power, and a current supplied electrical control system, connected to the power source, including the clutch coil, two circuits in parallel supplying current to the coil, a switch and an automatically controlled variable resistance in series in one of the circuits, and a switch in the other circuit.

18. In a vehicle according to claim 17 wherein means are provided for controlling the consecutive operation of the switches to render the latter effective to initially energize the circuit having the switch and variable resistance therein and consequently to energize the circuit having the switch to thus bypass the circuit with the variable resistance therein.

19. In a vehicle according to claim 17 wherein each switch is provided with two contacts, with a contact of each switch connected together for current flow therethrough, and means are provided for consecutively causing engagement of one contact of one switch with its other contact and a contact, of the other switch, having current connection with a contact of the first switch, with its other contact.

20. An electromagnetic clutch control system comprising an electromagnetic clutch including an input member adapted to be driven from an engine, an output member cooperable with the input member and a coil affixed to one of the members, a source of electrical power, and an electrical system, connected to the power source, supplying current to the coil including means for modulating the flow of current to the coil, means for by-passing the means for modulating the current to the coil, a switch in the by-passing means, a switch, in series with the modulating means, for controlling flow of current to the means for modulating the current to the coil, and means for sequentially closing first the switch for controlling the flow of current to the modulating means and then the switch in the bypass means.

References Cited in the file of this patent

UNITED STATES PATENTS

| | | |
|---|---|---|
| 1,491,426 | Schunemann | Apr. 22, 1924 |
| 1,939,606 | Hass | Dec. 12, 1933 |
| 1,946,200 | Easter | Feb. 6, 1934 |
| 2,513,521 | Sampietro | July 4, 1950 |
| 2,539,649 | Winther | Jan. 30, 1951 |

FOREIGN PATENTS

| | | |
|---|---|---|
| 326,921 | Great Britain | Mar. 27, 1930 |
| 610,519 | Great Britain | June 19, 1945 |
| 610,633 | Great Britain | Oct. 19, 1948 |
| 854,103 | France | Jan. 1940 |

OTHER REFERENCES

Ser. No. 374,882, Fuchs (A. P. C.), published June 15, 1943.